United States Patent [19]
Hill et al.

[11] 3,904,234
[45] Sept. 9, 1975

[54] MANIPULATOR WITH ELECTROMECHANICAL TRANSDUCER MEANS

[75] Inventors: John W. Hill, Palo Alto; Antony J. Sword, San Francisco, both of Calif.

[73] Assignee: Stanford Research Institute, Menlo Park, Calif.

[22] Filed: Oct. 15, 1973

[21] Appl. No.: 406,552

[52] U.S. Cl. ........ 294/106; 214/1 CM; 214/DIG. 2; 250/231 P
[51] Int. Cl. ........................................... B25b 11/00
[58] Field of Search ....... 294/86 R, 106; 214/1 CM, 214/DIG. 2; 250/229, 231 R, 231 P, 231 SE

[56] References Cited
UNITED STATES PATENTS

| | | | |
|---|---|---|---|
| 2,861,701 | 11/1958 | Bergsland et al. | 214/1 CM |
| 3,454,777 | 7/1969 | Marcus | 250/231 SE X |
| 3,509,583 | 5/1970 | Fraioli | 214/1 CM X |
| 3,628,024 | 12/1971 | Ciemochowski | 250/231 P X |
| 3,758,785 | 9/1973 | Maute | 250/229 |
| 3,783,274 | 1/1974 | Towne et al. | 250/229 X |

*Primary Examiner*—M. Henson Wood, Jr.
*Assistant Examiner*—Randolph A. Reese
*Attorney, Agent, or Firm*—Victor R. Beckman

[57] ABSTRACT

An articulated manipulator of the type which includes a pair of jaws relatively pivotally movable between open and closed positions under operation of an electric motor for picking up objects is disclosed. One or more electromechanical transducers are located on the jaws for force and slip sensing. The force sensors include spaced light source and light sensing elements attached to the manipulator jaws and a movable shutter or vane positioned therebetween for control of the amount of light from the source which strikes the light sensing elements. The shutter position, in turn, is controlled by a movable operating member at a face of the manipulator which is urged outwardly by resilient biasing member against external forces applied to the operating member. The shutter position, and therefore amount of light reaching the light sensing member, is proportional to the force required to move the operating member against the resilient biasing member. Different resilient biasing members including composite members having different stress-strain characteristics may be used for operation over different ranges of operating pressures and/or to provide the manipulator with different force sensing characteristics. A plurality of force sensors may be located on each jaw for sensing forces applied to the manipulator at locations other than the opposing jaw faces. Slip sensors for sensing slippage of gripped objects between the jaw faces also are contemplated, which sensors include rotatable disks mounted inside the jaws and having edges extending outwardly from the opposing jaw faces. The disks function also as code wheels, and code sensors within the jaws sense disk rotation. Provision for translational movement of the disks into the jaws is provided without producing an output from the code sensors. Also, a tool and tool holder for partial support of a tool are shown, which may be employed with the manipulator.

30 Claims, 11 Drawing Figures

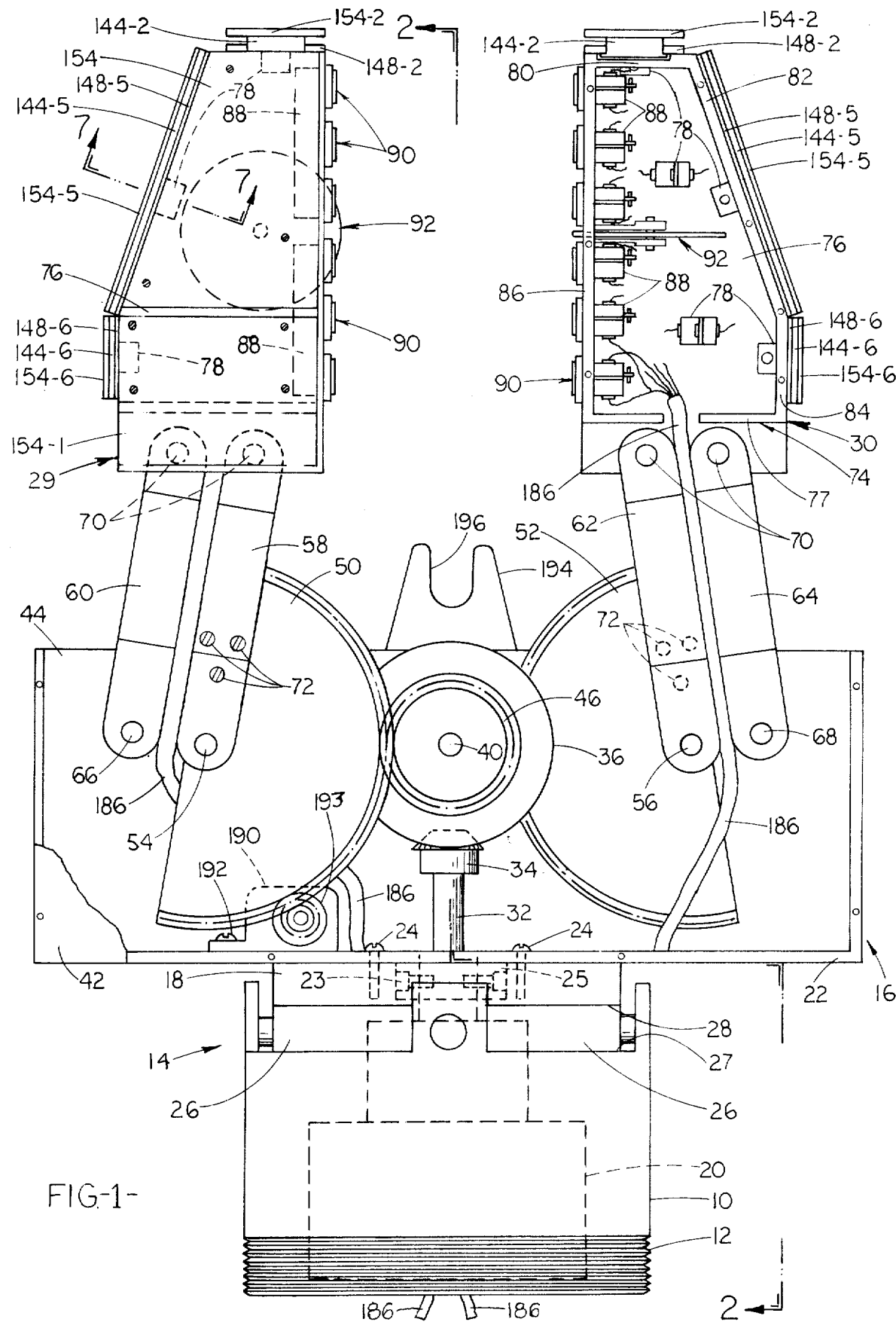
FIG-1-

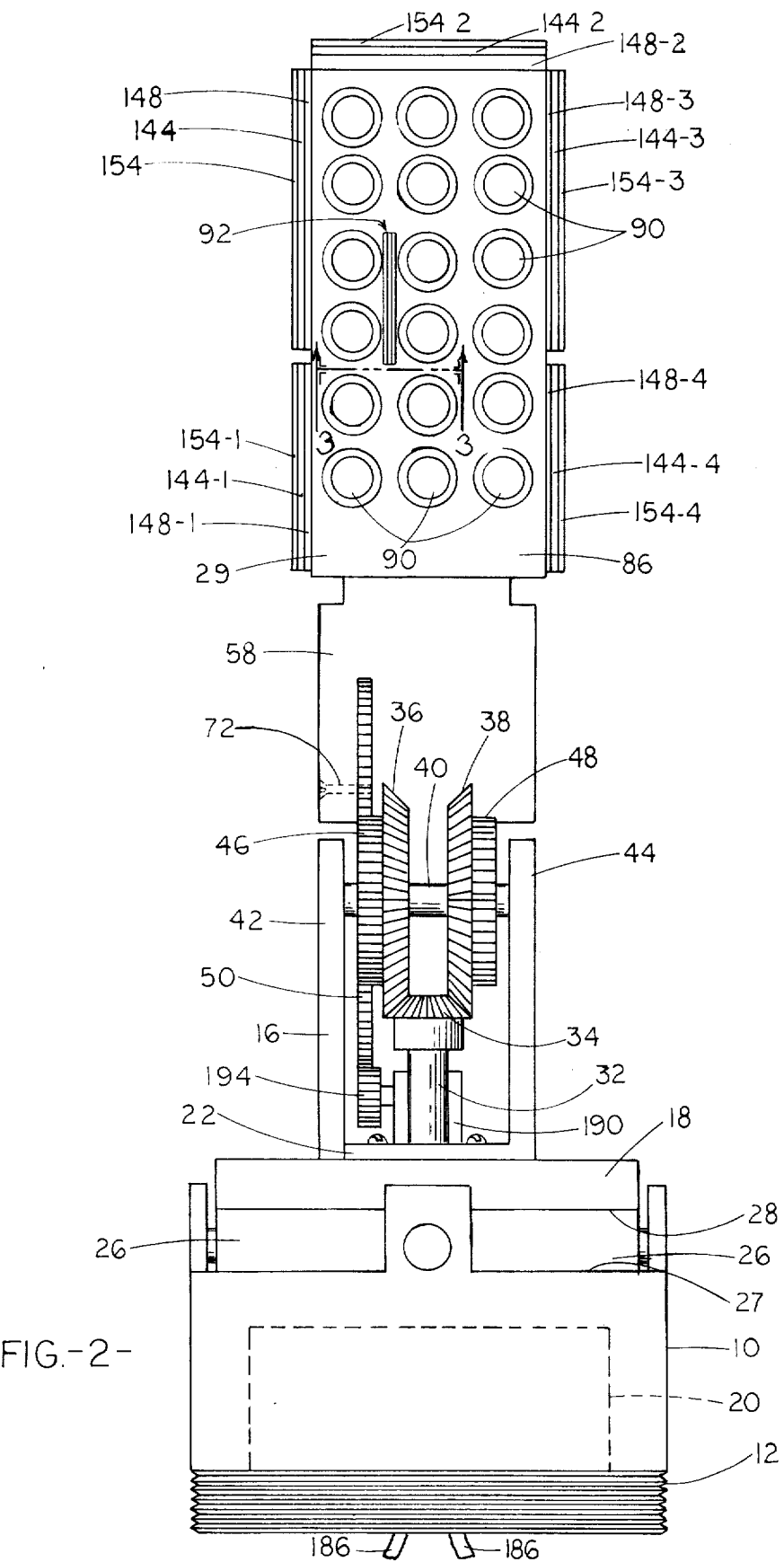
FIG.-2-

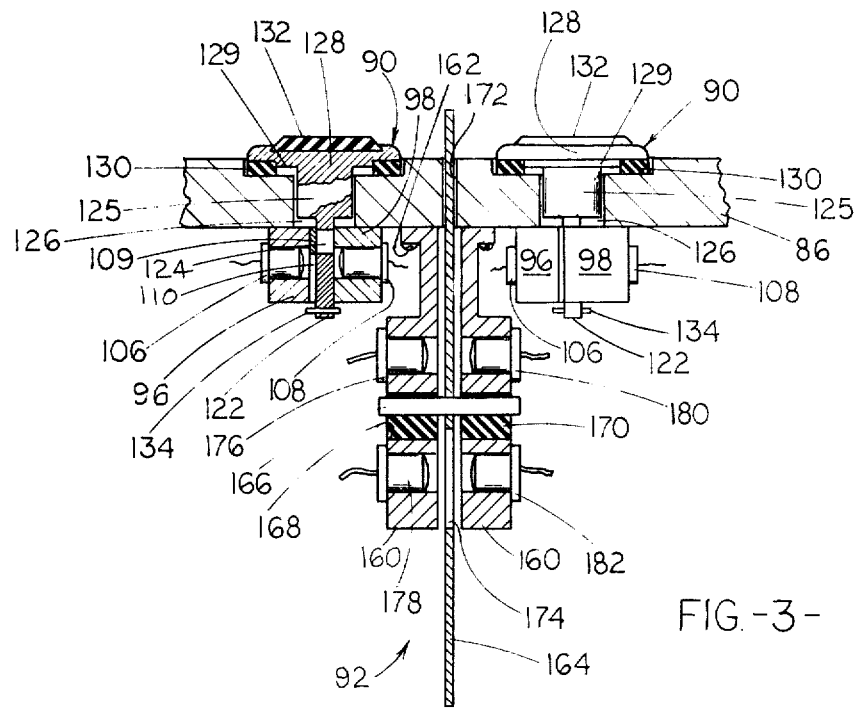
FIG.-3-
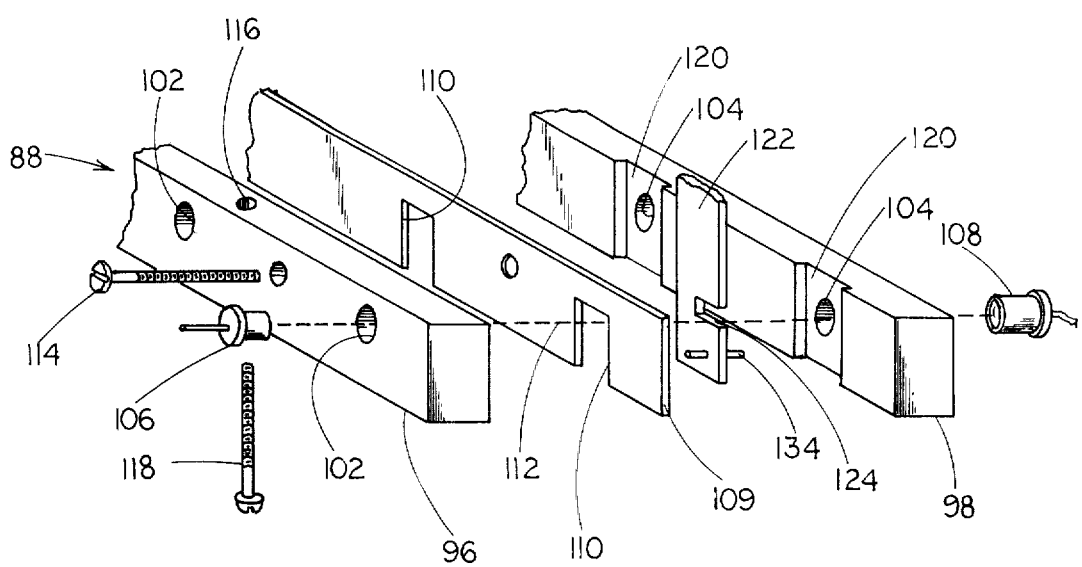
FIG.-4-

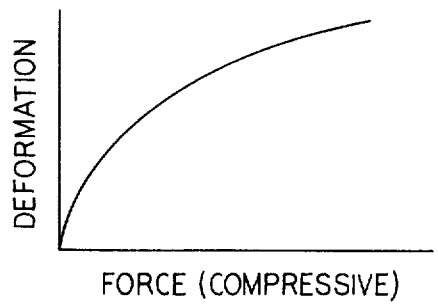
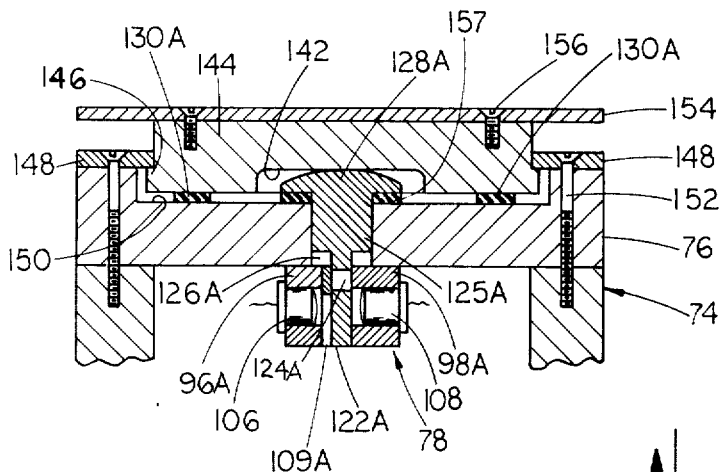
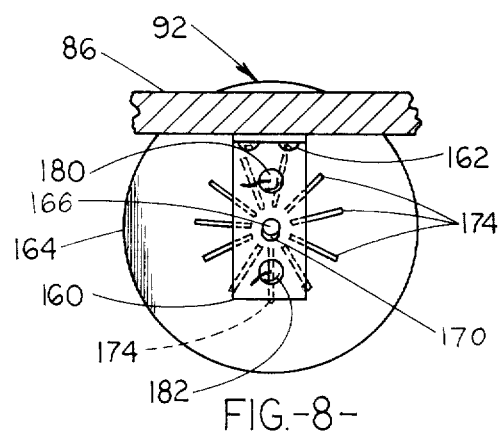
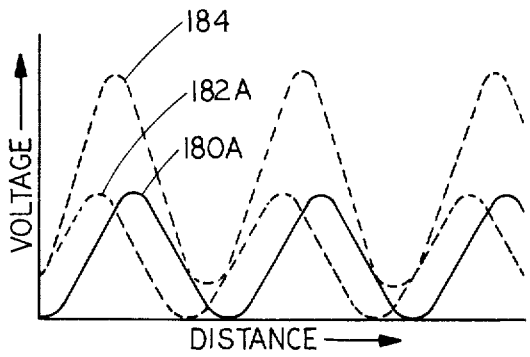
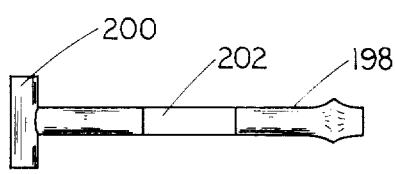
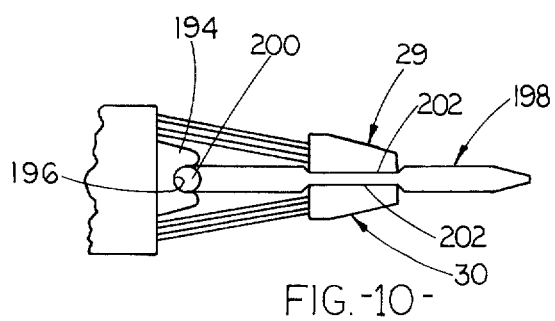

MANIPULATOR WITH ELECTROMECHANICAL TRANSDUCER MEANS

BACKGROUND OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

Manipulative devices are widely used in the scientific and industrial fields, in automated assembly lines, teleoperator systems, prosthetics, robots, and the like. They may be hand operated or powered hydraulically, electrically, etc. Many such manipulators are constructed without any sensing means whatsoever and consequently are operated without knowledge of the forces encountered in use. When sensors, or transducers, are employed, they may be of the on-off (i.e., binary) or proportional type. The on-off type merely indicates that a force is applied to the manipulator without any indication of the magnitude thereof. Proportional sensors, such as strain gauges, sometimes are incorporated in the manipulator to provide an indication of the magnitude of the force. Strain gauges often are difficult to incorporate into the manipulator structure and are relatively expensive and unreliable in use because of the dead weight and acceleration loading experienced when the manipulator is in motion.

SUMMARY OF INVENTION

An object of this invention is the provision of proportional transducer means adapted for use with articulated tongs, or the like, which are rugged, may be made of small size, and are readily convertible for use over different operating force ranges or with different operating characteristics.

An object of this invention is the provision of an articulated manipulator which includes a plurality of movable members each substantially covered with proportional transducers for sensing forces applied thereto from substantially any direction.

An object of this invention is the provision of a gripping type of manipulator having a pair of relatively movable jaws which are provided with slip sensors for sensing slippage of gripped objects from between the jaws.

An object of this invention is the provision of a manipulator with a tool holder for support of a T-shape handled tool.

The above and other objects and advantages are achieved by a manipulator which includes a generally hollow body to which one or more force transducers are attached. The transducers, in accordance with this invention, each comprise a transducer body or housing attached to the manipulator body and carrying a light source and photocell spaced from the source for sensing light therefrom. A movable vane or shutter is located between the source and photocell for modulating the amount of light which reaches the photocell in accordance with the vane position. The vane, in turn, is connected to and is actuated by a movable operating member at a face of the manipulator body. Resilient biasing means such as an elastomeric disk, spring, or the like urges the vane in one direction, and external forces on the operating member urge the vane in the opposite direction against the action of the resilient biasing means. The amount of light reaching the photocell is related to the force applied to the operating member, and the photocell output provides a measure of such force. The transducers are of a suffficiently small size to permit a plurality of them to be located on the manipulator body. For example, a plurality of transducer operating members may be located on a single face of the manipulator, such as the gripping surface of a jaw, for sensing the gripping force at different places thereon. Also, in addition to the gripping surface, other surfaces of the manipulator body may be provided with one or more transducer operating members for sensing forces applied to the jaws from different directions.

The resilient biasing means may be selected for the desired elastic properties. Within the elastic limits thereof, the load deformation curve of the resilient biasing means is substantially linear and with proper vane construction and selection of operating components, the transducer output from the photocell may be made substantially linear with the force applied. By use of a resilient biasing means having a nonuniform cross sectional shape a nonlinear load deformation curve may be obtained to provide for a transducer having different operating characteristics. Because of the wide variety of resilient biasing means which may be employed in the transducer of this invention, it will be apparent that a wide variety of transducer operating ranges and operating characteristics is possible.

The manipulator jaws are provided with slip sensors each of which comprises a rotatable disk extending from the jaw face. The disks are oriented in perpendicular planes which are mutually perpendicular to the opposing jaw faces and are mounted for radial movement to permit movement into the respective jaw bodies when an object is gripped between the jaws. The disks are coded, as by the use of alternate transparent and opaque areas thereon, and light emitting and light sensing means are located at opposite sides of the disk for sensing rotation thereof. With the above-mentioned orthogonal orientation of the disks in the jaw face or jaw faces, slippage of gripped objects in any direction in the plane parallel to the jaw faces is sensed. Such information could be used, for example, to increase the gripping force supplied by the jaws to stop such slippage.

Where the manipulator comprises a pair of relatively movable jaws, a tool holder or bracket may be provided at the jaw housing intermediate the jaws for engagement with the head of a T-shaped tool handle, the shank of which handle is grasped between the jaws.

BRIEF DESCRIPTION OF DRAWINGS

In the drawings, wherein like reference characters refer to the same parts in several views:

FIG. 1 is a plane view of a novel manipulator embodying this invention, with portions of a jaw and jaw actuating mechanism removed and broken away, respectively, for clarity of illustration;

FIG. 2 is a view taken along line 2—2 of FIG. 1 showing a portion of the manipulator in cross section;

FIG. 3 is an enlarged view taken substantially along line 3—3 of FIG. 2 showing force transducers and the slip sensor at one jaw;

FIG. 4 is an enlarged fragmentary exploded view showing one of the transducer means employed in the manipulator;

FIG. 5 is a modified form of resilient biasing means comprising a member having a triangular-shaped cross section, which member may be used with any of the force sensors shown in the drawings;

FIG. 6 is a compressive stress-strain diagram of the resilient biasing means shown in FIG. 5;

FIG. 7 is an enlarged fragmentary sectional view taken along line 7—7 of FIG. 1 showing a transducer and transducer actuating mechanism at one wall of a jaw;

FIG. 8 is a fragmentary side view of the slip sensor shown in FIG. 1;

FIG. 9 is a wave diagram showing the slip sensor outputs;

FIG. 10 is a fragmentary plan view of the manipulator showing a tool held thereby; and FIG. 11 is a side elevational view of the tool shown in FIG. 10.

DESCRIPTION OF PREFERRED EMBODIMENT

Reference is now made to FIG. 1 of the drawings wherein the manipulator is shown comprising a manipulator section 10 adapted to be coupled by threads 12 to a robot, automated maccchinery, earth, space or underwater vehicle, or the like (not shown) such as are presently in use. The manipulator section 10 is shown coupled through a wrist sensor, designated generally by reference numeral 14, to a gear box or housing 16 included in the manipulator hand. The wrist sensor 14 is disclosed and claimed in a copending patent application Ser. No. 406,553, filed Oct. 15, 1973, entitled "Force and Torque Sensing Method and Means for Manipulators and the Like" and which is assigned to the assignee of the present application by the inventors, John W. Hill and Antony J. Sword. The subject matter of the copending application specifically is incorporated herein by reference.

For present purposes, it will be understood that the wrist sensor includes a ring 18, one side of which is secured to the base 22 of the housing 16 as by screws 24 extending through holes in the base into threaded holes in the ring to secure the base and ring together. A reversible motor 20 is secured to this assemlage by means of screws 23 extending through threaded holes in a flange 25 on the base 22 of the housing 16 into holes in the motor base. Resilient coupling means 26, such as pads of rubber or like resilient material, are cemented or otherwise suitably secured between the forward face 27 of the arm section 10 and rearward face 28 of the ring 18 to secure the ring 18 (with the attached gear housing 16 and motor 20) to the arm section 10. The resilient coupling means 26 are deformed upon transmission of forces therethrough, and sensors, not shown, located adjacent the coupling means provide a measure of the transmitted forces and torques.

The reversible motor 20 serves to open and close a pair of jaws 29 and 30 through a suitable gear and linkage mechanism which now will be described. The motor shaft 32 extends through the ring 18 and an aperture in the base plate 22 and into the housing 16. A pinion 34 at the forward end of the motor shaft engages a pair of inwardly facing bevel gears 36 and 38 which are independently rotatably supported on a shaft 40 extending between the upper and lower walls 42 and 44, respectively, of the housing 16, as seen in FIG. 2. For clarity, the upper wall 42, which is removable to facilitate assembly, is shown broken away in FIG. 1. Attached to or formed on the bevel gears 36 and 38 at the outer sides thereof are spur gears 46 and 48 which engage sector gears 50 and 52, respectively, for drive actuation thereof. The sector gears 50 and 52 are rotatably mounted on shafts 54 and 56, respectively, extending between the upper and lower walls of the housing 16.

A first pair of parallel links 58 and 60 connectt the one jaw 29 to the gear housing 16, and a similar second pair of parallel links 62 and 64 connect the other jaw 30 to the housing. At the housing the links 58 and 62 are pivotally supported on the shafts 54 and 56 about which the sector gears pivot. The links 60 and 64 are pivotally mounted on shafts 66 and 68 between the housing walls 42 and 44. Pins 70 connect the forward ends of the links 58, 60, 62 and 64 to the jaws 29 and 30. The inner links 58 and 62 are slotted to receive the sector gears 50 and 52, respectively, and screws 72 secure the links to the gears.

Operation of the jaws 29 and 30 between open and closed position, although believed to be apparent, will now be briefly described. When the motor 20 is energized for rotation of the bevel gear 34, the meshing bevel gears 36 and 38 are counterrotated. The counterrotating gears 36 and 38 drive the gear segments 50 and 52 in counterrotating directions through the spur gears 46 and 48. The links 58 and 62 attached to the gear segments are thereby counterpivoted for closing or opening of the jaws. The links 60 and 64 which are parallel to the driven links 58 adn 62, respectively, maintain the jaw faces in parallel relation.

The jaws, with the novel electromechanical transducer means for force and slip sensing, now will be described. The jaw bodies, or frames, 74 for the pair of jaws are of substantially identical construction and, as viewed from above as in FIG. 1, include a generally rectangular proximal end and truncated pyramidal distal end. The jaw bodies are hollow and have removable top and bottom walls 76 (the top wall of the jaw 30 being shown removed therefrom), which walls are mirror images but which are identified with the same reference numeral for clarity. The rear ends of the removable walls 76 which overhang the rear wall 77 of the housing provide support for the pins 70 in the connection of the parallel links to the housing. Two novel force transducer means 78 are shown attached to the inside of each of the removable top and bottom walls 76, as seen in FIG. 1. Similarly, transducer means 78 are attached to the forward wall 80, to the inclined outer wall 82 at the distal jaw portion, and to the proximal outer wall portion 84.

The inner facing walls 86 of the jaws are shown provided with a plurality of transducer means 88 which are of similar design to the transducer means 78 at the other walls of the jaws. In the exemplary arrangement there is shown a 3×6 array of transducer actuating means, such as buttons, 90 for the transducer means 88 at the inner jaw faces, whereby the force applied at the 18 separate locations on each of the jaw faces may be sensed. Also, located within the jaws are slip sensors 92 of identical design but differently oriented for sensing object slip transversely and longitudinally of the jaw faces, which sensors are described in greater detail hereinbelow.

The proportional force trannsducer means 78 and 88 employed in the manipulator of this invention now will be described. Two transducer means 88 are shown in the fragmentary sectional view of FIG. 3, and an enlarged fragmentary exploded view of one is shown in FIG. 4, to which figures reference now is made. The transducer means includes a pair of body members 96 and 98 having axially aligned apertures 102 and 104, respectively, extending therethrough. In use there are three such pairs of axially aligned apertures in the body members for the support of three force sensing means. A light source 106, such as a light emitting diode, frictionally fits within the aperture 102, and a light responsive means 108, such as a phototransistor, frictionally fits within the aperture 104 to receive light from the source 106. The apertures 102 and 104 are cylindrical to receive the cylindrical shaped light source and sensor means. Preferably, an aperture plate, or mask, 109 is sandwiched between the body members, which plate is formed with rectangular shaped apertures 110 positioned along the light beam axes 112 to limit the light beams to a generally rectangular cross sectional shape. The body members and aperture plate are secured together as by screws 114 extending through holes in the body member 96 and aperture plate 109 and engaging threaded holes in the body member 98. Also, holes 116 may be formed in the body members to accommodate screw fastening means 118 for securing the force transducers to the manipulator jaws. Obviously, other mounting means, such as straps which extend across the transducers and which are secured to the jaws, may be used to secure the transducers to the jaws.

The body member 98 is shown formed with slots or grooves 120 which extend transversely of the apertures 104 from the top to the bottom of the body member. The grooves accommodate light vane or shutter means 122 which are slidably movable therewithin in a transverse direction to the light axis 112. An elongated, rectangular shaped light transmitting aperture 124 is formed in the vane 122 which extends generally perpendicular to the slot 110 in the aperture plate. It will be apparent that a variable portion of the light beam from the source 106 may reach the light sensor 108, with the amount of light depending upon the position of the movable vane 122. In the illustrated arrangement, the light from the source is substantially totally blocked when the light vane is in a normal raised position, and an increasing amount of light is transmitted to the light sensor as the light vane is moved inwardly. The current output from the phototransistor 108 increases directly with increased light received thereby.

The operating mechanism for actuation of the movable vanes or shutters 122 includes the operating members, or buttons, 90 at the gripping surfaces of the jaws. As seen in FIG. 3, the exemplary operating members 90 each comprise a cylindrical shaped body portion 125 axially slidably movable within apertures 126 in the walls 86 at the operating faces of the jaws. The light vanes 122 are formed on or attached to the bodies 125 for movement therewith.

Each of the operating members includes a head 128 comprising a radial flange 129 on the body portion 125. The outer ends of the apertures 126 are recessed to receive a resilient biasing means 130 between the head 128 and bottom of the recess for resiliently biasing the operating members outwardly from the outer face of the wall 86. Gripping members 132 of plastic, rubber, or like material having a high coefficient of friction with items to be gripped may be employed at the face of the heads to increase the gripping power of the jaws. In the illustrated arrangement the gripping members comprise resilient disks carried within recesses within the heads and extending from the face thereof. A retaining and stop pin 134 extends through an extension of the vane 122 inside the jaws and is engageable with the transducer body to retain the vane and operating means in operative position as illustrated.

Normally, in the undepressed condition of the operating members 90, the resilient biasing means 130 urges the light vane outwardly, which movement is limited by engagement of the pin 134 with the transducer body. In this unactuated condition, the aperture 124 in the vane is positioned to block substantially all light from the light source 106 to the light sensor 108. When the actuating means 90 is depressed by application of an inwardly directed force thereon, the vane is moved across the light beam axis to allow light from the source to reach the sensor. Within the elastic limit of the resilient biasing means 130, the distance which the vane 122 is moved when the operating means 90 is depressed is directly related to the inward force on the operating means. Also, with the illustrated rectangular shaped apertures 110 and 124 in the aperture plate 109 and vane 122, respectively, the amount of light passing therethrough to the sensor is directly related to the operating force.

The resilient biasing means 130 may comprise a disk of elastomeric material such as natural or synthetic rubber, plastic or the like. Alternatively, a metallic or plastic spring member may be employed. Such materials may exhibit a substantially linear compressive stress-strain characteristic within the elastic limits thereof, within which limits the transducers may operate. Obviously, the invention is not limited to operation along only a linear portion of the compressive stress-strain characteristic of the resilient biasing means.

With the present arrangement the removal and replacement of resilient biasing means are easily accomplished by simply removing the retaining pins 134 for release of the acttuating means. To extend the operating range and/or alter the operating characteristics of the transducers, resilient biasing means with different cross sectional shape, or formed as a composite unit from elements having different elastomeric properties, may be used. In FIG. 5, for example, a resilient biasing means 136 having a triangular cross-sectional shape is shown. A compressive stress-strain diagram for the member 136 is shown in FIG. 6 in which greater deformation is experienced per unit force during initial application of a commmpressive force, which rate of deformation decreases with increased force. Further, conventional "O" rings which are commercially available in a wide variety of sizes and properties may be used.

The transducer means 78 are of substantially the same design as the transducer means 88 described above. Reference is made to FIG. 7 wherein a transducer means 78 is shown comprising body members 96A and 98A, an aperture plate or mask 109A sandwiched therebetween, a movable shutter or light vane 122A attached to the body portion 125A of the operating member extending through an aperture 126A in the removable plate or wall 76, resilient biasing means 130A between the plate 144 and the wall 76, and light emitter and light sensor means 106 and 108 mounted in the members 96A and 98A. The head 128A is positioned in a recess 142 formed on the inner surface of movable actuating plate 144 at the geometric center of the resilient biasing means 130A. Outwardly extending flanges 146 are formed at opposite edges of the plate, and overlying restraining members 148 attached to the wall limit outward movement of the plate. The flanges area of the plate is movable withih a recess 150 formed at the outer surface of the wall 76. Screws 152 which extend through the stop members 148 and wall 76 fixedly secure the same to the jaw body 74. A cover plate 154 is attached by screws 156 to the actuating plate. A lightweight resilient biasing means 157, of soft rubber or the like, between the head 128A and the wall 76 returns the vane 122A to the raised position to block light from the source 106 to the sensor 108 when the actuating plate 144 is in the undepressed condition. With this arrangement the light vane 122A and associated operating means are maintained in position without the need for a retaining pin such as pin 134 used in the transducer means 88 described above.

The force transducer means 78 at other locations of the jaws are of the same generic design, except the size and shape of the actuating plate 144, restraining members 148, and cover plate 154 conform to the size and shape of the wall portion at which the transducer means are located. For purposes of identification, these similar parts are supplied with the same reference numerals followed by a postnumeral for distinguishing between the same, such as 144-1, 144-2, etc., 148-1, 148-2, etc., and 154-1, 154-2, etc.

Normally, in the undepressed condition of the actuating plate 144 the resilient biasing means 130A urges the plate 144 outwardly into engagement with the restraining means 148, and the soft resilient biasing means 157 urges the head 128A of the operating member into the recess 142 in the plate 144. In this unactuated condition the aperture 124A in the vane 122A is positioned to block substantially all light from the source 106 to the light sensor 108. If an actuating force is applied directly above the head 128A of the operating member, the plate 144 and attached cover are moved linearly in the direction of movement of the shutter or vane, evenly compressing the resilient biasing means 130A (and 157) along its entire length. If the force is not applied directly over the head 128A (but is applied within the projected area of the resilient biasing means 130A), the plate 144 is tilted and the resilient biasing means 130A is compressed to a greater extent where the force is most directly applied. In either case, for the same actuating force on the plate 144, the vane 122A is moved the same distance. Consequently, within the elastic limit of the resilient biasing means 130A, the distance which the vane 122A is moved when the plate 144 is depressed is directly related to the inward force thereon. As with the biasing means 130, the resilient biasing means 130A are easily removed and replaced when desired to provide the transducer with the desired operating characteristics and/or operating range.

A description of the slip sensors 92 now will be made. As noted above, the slip sensors 92 in the jaws 29 and 30 are of identical design but are oriented differently for sensing slip of a gripped object in any direction in a plane extending parallel with the gripping surfaces of the jaws. To facilitate such mounting of the slip sensors within the jaw bodies, the transducer means 88 are oriented logitudinally within the jaw 29 (as seen in broken lines in FIG. 1) and transversely within the jaw 30. As shown in FIGS. 3 and 8, the slip sensor 92 comprises a pair of supporting members 160 attached a spaced distance apart to the jaw wall 86 as by screw fasteners 162. A disk 164, which functions as a combination motion sensing and code wheel, is attached to a shaft 166 rotatably mounted between the members 160. The shaft 166 is supported within elongated apertures 168 in the members 160, and resilient biasing means 170, such as elastomeric members, at the inner end of the apertures urge the shaft and attached disk 164 radially outwardly for estension of the disk from the gripping surface of the jaws through a slot 172. It will be apparent that when an object is gripped between the jaws, the disks are urged inwardly against the action of the resilient biasing means 170. The disk 164, of course, remains rotatably mounted regardless of its radial position. Other means, such as springs acting on bearings supporting the shaft 166, may be used to bias the disk in place of the elastomeric members 170.

The disk may be coded, for example, by inclusion of a series of radially extending light transmitting areas such as elongated slots 174 therethrough separated by opaque areas. In the illustrated arrangement, for reasons which will become apparent hereinbelow, an odd number of slots are employed. The supporting members 160 have axially aligned apertures therein at diagonally opposite locations opposite the ends of the elongated mounting apertures 168 for the support of light emitting means 176 and 178 and light sensing means 180 and 182, respectively, at opposite sides of the disk 164 adjacent the apertures 174. Light from a source passes through the apertures 174 when the apertures are aligned with the light beam axes for illumination of the light detectors. Radial movement of the disk when gripping an object has substantially no effect on the sensor outputs because of the elongated nature of the apertures 174 and the positioning of the light emitters and sensors relative thereto.

If slippage of an object gripped by the jaws occurs, one or both of the slip sensor disks at the opposite jaws will be rotated depending upon the direction of slippage relative thereto. As a disk 164 is rotated, variable outputs are produced at the sensors 180 and 182, designated waveforms 180A and 182A in the diagram of FIG. 9. Sensors 180 and 182 are spaced aroung the operative circle so that the output from one sensor leads or lags that from the other by approximately 90 degrees. In the waveform diagram of FIG. 9, the waveform depicting the sum of the voltages is identified by reference number 184. With a knowledge of the disk diameter and the number of apertures formed therein, it will be apparent that any of the signals 180A, 182A or 184 may be converted into pulses, with the number of pulses being indicative of the amount of slippage. Also, it will be apparent that the phase of the two signals 180A and 182A is indicative of the direction of slippage, i.e., direction of rotation of the disk. This information as to direction and amount of rotation produced by slippage of an object between the jaws may be conveyed to any desired utilization means (not shown).

The leads to and from the slip sensors and force transducers within the jaws may be cabled, as identified by reference numeral 186 in FIG. 1, and fed from the jaws to the housing 16. Indication of the relative position of the jaws 29 and 30 may be provided by means of a potentiometer 190 attached by screws 192 to the base 22 of the housing 16 and coupled through a spur gear 193 to one of the gear segments 50. The potentiometer setting is directly related to the jaw position, and leads (not shown) from the potentiometer also may be extended back through the member 10 for connection to a suitable utilization circuit. The various force, slip and position signals provided by the novel manipulator of this invention may be used for indication and/or control purposes, as is well understood by those skilled in this art.

To lend added versatility to the manipulator, the hand may be provided with tool holding means comprising brackets 194 extending from the forward top and bottom edges of the housing 16. The forward ends of the brackets are slotted as at 196 to receive the head of a T-shaped handle 200 of tool 198 shown in FIGS. 10 and 11. The tool 198 includes a cross head 200 which fits within the slots, or notches, 196 and a shank having flats 202 along opposite sides thereof which may be tightly gripped between the jaws. For purposes of illustration, the tool is provided with a screwdriver blade at the forward end. A switch (not shown) may be included at the base of a notch 196 to indicate that the T-handle is firmly seated and that the tool can be grasped. The inside jaw sensors 88 signal when proper grasp has been achieved. With the illustrated arrangement, the tool is tightly held and may be subjected to large forces and torques without slippage.

The invention having been described in detail in accordance with the requirements of the Patent Statutes, various changes and modifications will suggest themselves to those skilled in this art. For example, the proportional force transducers may be modified for location of the resilient biasing means at a different location in the structure. Also, tension rather than compression type resilient biasing means may be used. In addition, the light vane may be arranged to block light to the light sensor rather than to admit more light thereto upon actuation of the transducer. Also, complete blockage of light by the light vane is not required since the utilization circuit to which the light sensor outputs are connected may be arranged to electrically compensate for output potentials present in the absence of an actuation force to the transducers. Also, only one manipulator jaw need by movable, and both slip sensors could be located in a single jaw. Furthermore, the force transducers may be used without the slip sensors, and slip sensors used without the force transducers. In addition, force transducers need not be located at every face of the jaws, or employed in the numbers illustrated. It is intended that the above and other such changes and modifications which fall within the spirit and scope of the invention will be covered by the appended claims.

We claim:

1. In a manipulator of the type which includes a pair of relatively movable jaws having opposing jaw faces between which an object may be gripped, force transducer means at the face of at least one jaw for providing an electrical output related to the force applied thereto, said force transducer means comprising:
   means forming a beam of light;
   a photocell positioned to receive the light beam;
   a light vane movable in opposite directions across the light beam path to vary the amount of light which reaches the photocell in accordance with the vane position;
   means for resiliently biasing the vane in one direction; and
   vane operating means connected to the vane and including a movable member at a jaw face for moving the vane in the opposite direction against the action of the resilient biasing means upon application of an external force thereto.

2. The manipulator as defined in claim 1 wherein said vane operating means is located at one of said opposing jaw faces for sensing the force with which an object is gripped thereat.

3. The manipulator as defined in claim 2 which includes a plurality of said force transducer means with a plurality of associated vane operating means at said one of said opposing jaw faces for individually sensing forces applied at different locations at said one jaw face.

4. The manipulator as defined in claim 2 which includes a plurality of said force transducer means with a plurality of associated vane operating means at other jaw surfaces for individually sensing forces applied at said other jaw surfaces.

5. The manipulator as defined in claim 1 wherein said means forming a beam of light includes a light emitting diode, and said photocell comprises a phototransistor.

6. The manipulator as defined in claim 1 wherein said light beam is substantially totally blocked by the vane in the unactuated condition of the vane operating means.

7. The manipulator as defined in claim 6 wherein the amount of light reaching the photocell is substantially directly proportional to the force applied to the movable member of said vane operating means.

8. The manipulator as defined in claim 1 wherein said resilient biasing means comprises a member with triangular cross section to provide a nonlinear force at the vane operating means versus vane movement characteristic.

9. The manipulator as defined in claim 1 including slip sensor means at at least one of the opposing jaw faces for sensing slippage of an object gripped between said jaws.

10. The manipulator as defined in claim 9 wherein said jaws are hollow and include walls which include the opposing jaw faces, said slip sensor means including a rotatable disk extending through an aperture in one of said walls, and means including code means on said disk for sensing rotation thereof.

11. The manipulator as defined in claim 10 wherein said slip sensor means includes a pair of said disks which are orthogonally oriented and rotatable by slippage of an object between the jaws.

12. In a manipulator of the type which includes a pair of relatively movable jaws having opposing jaw faces between which an object may be gripped, at least one of said jaws comprising walls forming a generally hollow body, proportional force transducer means at a face of said hollow body jaw for providing an electrical output related to the force applied thereto, said force transducer means comprising:
   a sensor body fixed inside the jaw body;
   spaced apart light source and light sensing means carried by said sensor body with a light beam path therebetween;
   a light vane movable in opposite directions across the light beam path at said sensor body to vary the amount of light which reaches the light sensing means in accordance with the vane position;

movable vane operating means extending through a jaw body wall and attached to said vane for moving the vane upon application of an external force thereto;

resilient biasing means for urging said vane operating means and attached vane in an outward direction from said jaw body wall; and readily removable means for limiting outward movement of said vane operating means, said resilient vane biasing means being readily interchangeable upon removal of said removable limiting means.

13. The manipulator as defined in claim 12 wherein said resilient biasing means comprises an annular elastomeric member.

14. The manipulator as defined in claim 13 wherein said annular elastomeric member is located between a head formed on said vane operating means and the outside face of the jaw body wall through which said vane operating means extends.

15. A manipulator comprising:
a hand having a pair of relatively movable members with gripping faces between which an object may be gripped; and
slip sensor means at at least one of said relatively movable members for sensing slippage of an object gripped between said members.

16. The manipulator as defined in claim 15 wherein said slip sensor means comprises a rotatable member extending from the gripping face of said one hand member and engageable with an object gripped between said relatively movable members.

17. The manipulator as defined in claim 16 wherein said rotatable member comprises a disk mounted also for translational movement into said hand member by engagement with a gripped object.

18. The manipulator as defined in claim 17 including; means with an electrical output for sensing rotation of said disk.

19. The manipulator as defined in claim 15 wherein said slip sensor means includes means for sensing slippage of a gripped object in first and second orthogonal directions along the gripping faces of said relatively movable members.

20. The manipulator as defined in claim 15 including: proportional force transducing means at at least one of said relatively movable members for sensing gripping force on an object gripped between said members.

21. In a manipulator of the type which includes a pair of relatively movable gripping members having opposing faces between which an object may be gripped, a slip sensor for sensing sliding motion of an object along a gripping member face comprising:
a disk having an edge extending outwardly from the face of said gripping member engageable with a gripped object and rotatable about an axis to the rear of the face;
means for translationally resiliently biasing said rotatable disk outwardly from the face of said member; said disk being formed with an alternating series of radially extending light opaque and light transmissive sections arranged in a circle about the disk axis; and
light emitting and light sensing means at opposite sides of the disk so that light therebetween passes through a light transmissive section of the disk for detecting rotation thereof by reason of a variable amount of light reaching said light sensing means as said disk is rotated.

22. The manipulator as defined in claim 21 wherein said light emitting and light sensing means include first and second pairs of light source and light detecting means generally diametrically oppositely located in the direction of translational movement of the disk.

23. A manipulator comprising:
a hand having a pair of relatively movable jaws between which a tool may be gripped;
means for supporting said relatively movable jaws; and
tool holder means at said supporting means for engagement with a tool gripped between said jaws.

24. The manipulator as defined in claim 23 wherein said tool holder means is formed with a notch to receive the head of an elongated tool grasped between the manipulator jaws to prevent rotation of the grasped tool when subjected to torque about its longitudinal axis.

25. A manipulator comprising:
A hand having a pair of jaws;
a housing;
means for mounting the jaws on the housing for relative pivotal movement for grasping members therebetween;
a motor attached to said housing and connected to said jaws for relatively pivotally moving the same; and
tool holder means attached to said housing intermediate said jaw mounting means adapted for engagement with the end of a tool to be grasped between the jaws.

26. The manipulator as defined in claim 25 wherein said tool holder means includes forwardly directed brackets formed with notches at the forward end thereof to receive the head of a tool.

27. The manipulator as defined in claim 26 including a tool having a shank adapted to be grasped by said jaws and a cross head engageable with said brackets.

28. The manipulator as defined in claim 27 wherein said shank is formed with opposite disposed flats for grasping between the jaws.

29. A proportional force transducer comprising:
a source of radiant energy;
a detector of radiant energy from said source to produce an output dependent upon the amount of radiant energy received from said source, said source and detector of radiant energy being relatively fixed;
an element relatively movable with respect to said source and detector and having an energy transparent region, for passage of energy from said source to said detector, and an adjacent energy opaque region to block transmission of energy therebetween;
resilient means comprising an annular elastomeric member connected between said element and said source and detector for resiliently biasing the same in one direction; and
means for moving said element relative to said source and detector against the biasing action of said resilient means to change the amount of radiation to reach said detector from said source.

30. The proportional force transducer as defined in clam 29 wherein the output from said detector is directly related to the force required to move said element against the biasing action of said resilient means.

* * * * *